…

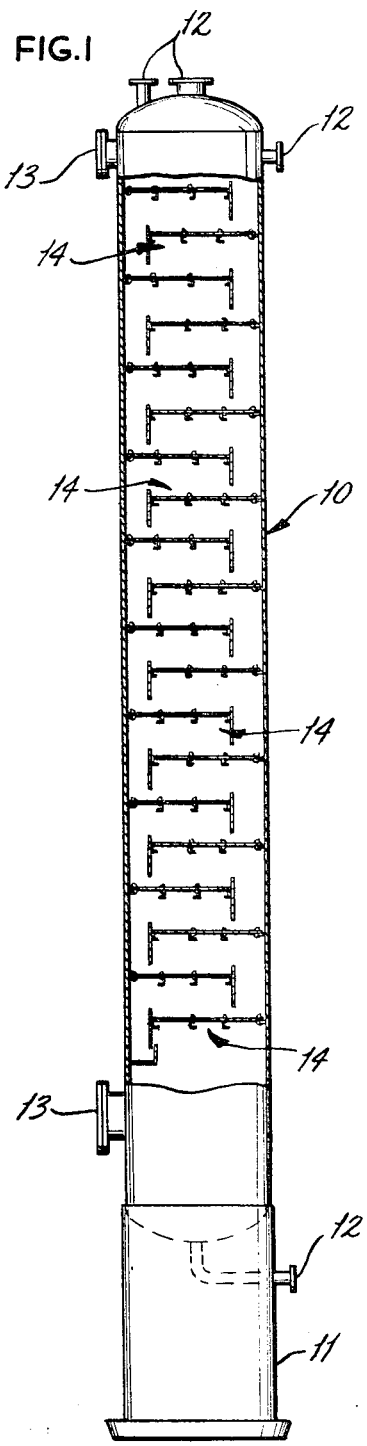
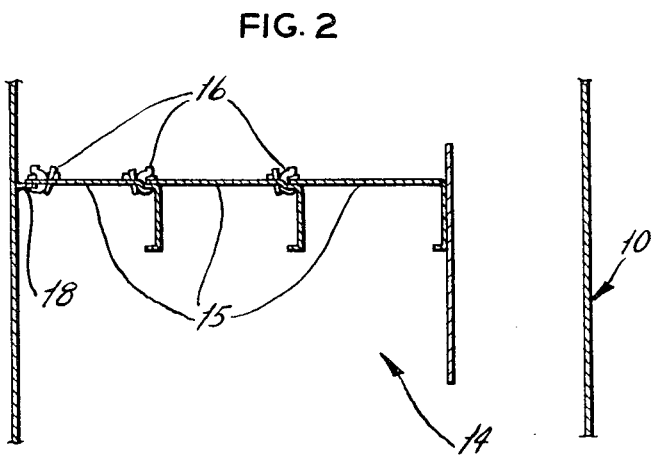
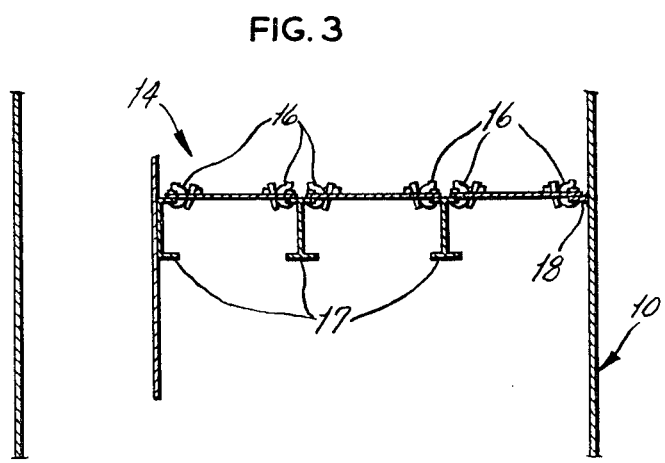
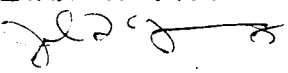

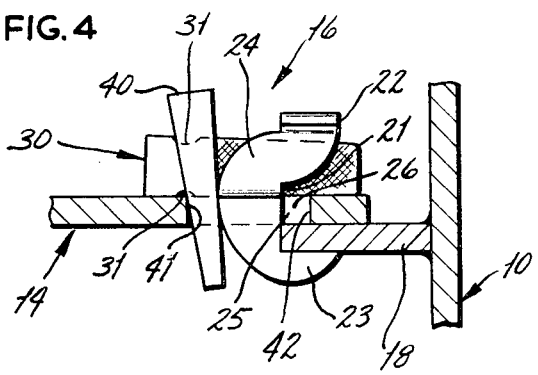
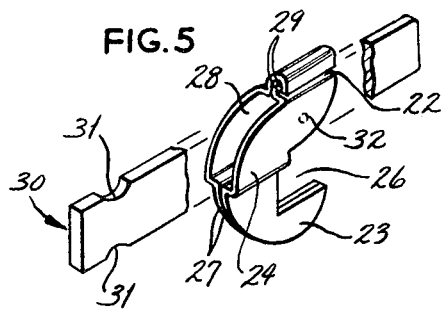
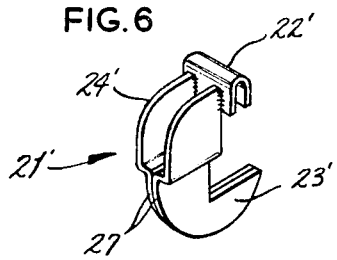
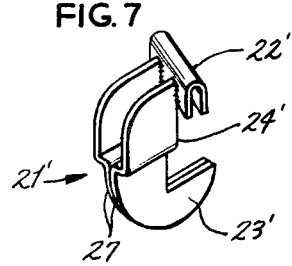
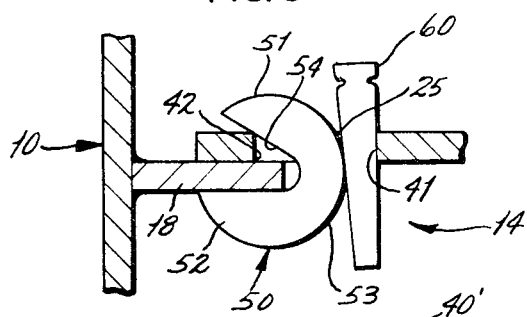
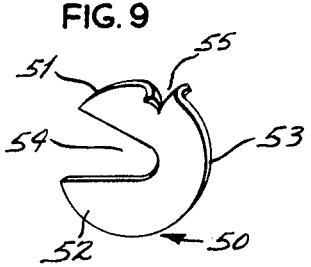
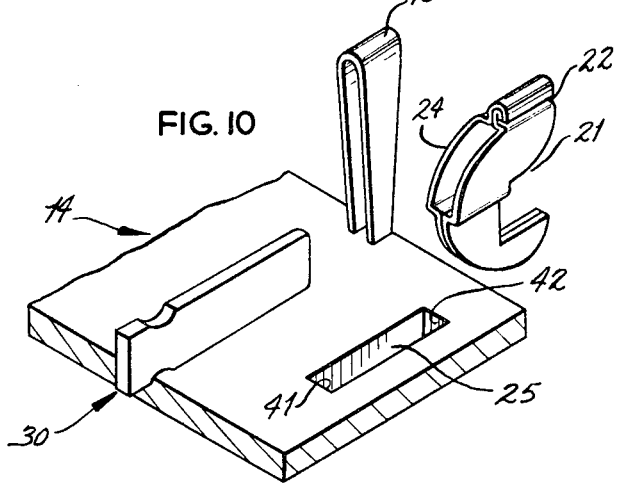

United States Patent Office 3,649,466
Patented Mar. 14, 1972

3,649,466
VACUUM DISTILLATION COLUMN WITH TRAY ASSEMBLY FASTENING DEVICE
George B. Boon, Webster Groves, and Evan W. Pittenger, Creve Coeur, Mo., assignors to Monsanto Company, St. Louis, Mo.
Filed Nov. 13, 1969, Ser. No. 876,426
Int. Cl. B01d 3/18
U.S. Cl. 202—158
10 Claims

ABSTRACT OF THE DISCLOSURE

A vacuum distillation column comprises a support, a shell, a tray support ring affixed to the shell, a distillation tray and a wedge-type fastening device which rigidly affixes the tray to the support ring but still allows easy removal of the tray for access to the column interior. The tray and support ring rigidly fastened together by the wedge-type fastening devices form an internal reinforcing diaphragm which stiffens the shell of the column preventing its collapse under the force of atmospheric pressure and eliminates the need for other shell stiffening devices. The wedge-type fastening devices may also be used to rigidly fasten tray segments and other members of the column together.

FIELD OF THE INVENTION

This invention relates to the chemical and oil refining industries. More particularly it relates to a new and useful design for vacuum distillation columns.

DESCRIPTION OF THE PRIOR ART

In producing chemical and oil refining products the distillation process is widely used to separate the various components of the chemical plant or oil refinery streams. Vacuum distillation, i.e. distillation at less than normal atmospheric pressure, has been a useful technique particularly when separating components which may be reactive or unstable at elevated temperatures. In recent years vacuum distillation has been utilized to an increasing degree as finer separations are required and a wider variety of reactive products are produced.

A distillation tower or column operated at less than atmospheric pressure must be carefully designed so that it will not collapse under the total force exerted on it by the pressure of the atmosphere. Reinforcing the shell of the column at spaced intervals along the longitudinal axis of the column has been found to give a shell which is equivalent in strength to an unreinforced column of substantially greater shell thickness and weight. As a result, the process design engineer has been able to utilize vacuum distillation columns of great height and large size virtually unlimited by consideration of shell steel thickness. It has recently become apparent that present methods of reinforcing the column shell are themselves limiting the efficiency of column design and operation and that a new vacuum distillation design is needed which can perform at the high efficiency level required by today's process economics. Supplementary reinforcing means for the column shell presently in use include internal members extending from one point on the shell of the column to another and stiffening rings extending around the circumference of shell and affixed to either the interior (internal stiffening rings) or the exterior (external stiffening rings) surface of the shell.

Internal reinforcing members are a very inefficient means of stiffening the column shell since they provide reinforcement at only the points where the member is affixed to the shell. To provide adequate reinforcement to the shell such a multiplicity of members is necessary that the throughput and efficiency of the column is restricted to a point that the economics of the process utilizing the column are adversely affected.

The use of stiffening rings has provided an improved means of shell stiffening compared to the internal member in that the stiffening ring provides reinforcing to the entire circumference of the shell. However, stiffening rings substantially increase the cost of a column because of the high labor cost in welding or otherwise attaching the numerous massive rings to the shell. Likewise, placement of manways and openings for connecting to the column lines carrying effluent and feedstocks is restricted to an extent that efficiency of operation is substantially decreased and access to the column interior for maintenance is hindered. Additionally, internal stiffening rings also tend to limit column capacity, particularly in large size columns where the rings are quite wide and thick, by restricting fluid flow within the column.

If an existing internal member of the column could be used to reinforce the shell, it would be possible to stiffen the column without the necessity for additional members which interfere with the operation and maintenance of the column and add to its complexity and cost of construction. Vacuum distillation columns have been constructed which utilize the trays as internal reinforcing diaphragms for stiffening the column shell. However, since an effective reinforcing member must be rigidly affixed to the column shell and cannot be allowed any movement relative to the shell to prevent collapse of the shell, such vacuum distillation columns have utilized trays which are welded or bolted to the tray support ring of the column. This has been found to be necessary since other known fastening devices are not capable of rigidly affixing the trays to the tray support ring or eliminating any lateral movement of the members held together by the fastening device with respect to each other.

A vacuum distillation column with trays welded to the support ring is extremely expensive to construct, very difficult to maintain or clean, inflexible in its utility and, as a result, of relatively limited commercial interest. Welding is a tedious time-consuming process requiring highly skilled and expensive labor. When performed in cramped locations where access is relatively limited it is even more difficult to perform. These factors result in very high construction costs. Since the trays once installed may be removed only by a cutting torch or a similar device, maintenance or cleaning is at best difficult if not almost impossible because of the limited access to the column interior. Since the arrangement and type of trays are fixed once the column is constructed, use of the column is restricted to a narrowly limited range of functions. Conversion for use in an alternate process by replacing trays requires an almost complete reconstruction of the column.

A vacuum distillation column with trays bolted together and to the tray support ring of the column is of greater commercial interest than a column with welded trays but it still falls outside the limits of the minimum flexibility of operation and maximum cost of construction required for present-day processes. Precision placement, drilling and sizing of bolt holes in the tray and the support ring requires a high degree of skill and is not compatible with mass production of trays and tray segments. Placement of each tray segment on its support ring becomes a customized operation which substantially raises construction costs. Maintenance is complicated by the need to remove bolts in positions where access is limited, bolts which may be corroded or coated with residue, and bolts whose threads may be galled or damaged all of which tend to lengthen maintenance shutdowns. Additionally, replacement trays must be marked and drilled on site to be certain that tray bolt holes exactly match existing holes in tray support rings and other fixed members. Thus, although bolted tray columns have wider utility than welded tray columns, they do not fulfill the recognized industry need for an economical, flexible vacuum distillation column design which does not require additional reinforcing rings or other members.

Wedge-type fastening devices have been developed to facilitate installation, removal, and replacement of trays which overcome the economic and design problems encountered with welded and bolted tray assemblies. While these devices have succeeded in improving the efficiency of initially installing and later replacing of moving trays, the trays which are fastened in place by currently available wedge-type devices can not be used as internal reinforcing members in vacuum distillation columns. As a result, vacuum distillation columns using available wedge-type fastening devices must utilize additional reinforcing members to stiffen the shell and prevent its collapse under the force of atmospheric pressure.

Present wedge-type fastening devices for trays and tray segments are satisfactory for restraining separation of the tray from the support or separation of the tray segments from each other. However, present fastening devices do not rigidly affix the tray to the support or the segments together but rather they allow lateral or sliding movement of the affixed members relative to each other parallel to the long dimension of the slots through which the devices operate. Prior art teachings indicate that such lateral movement is desirable to allow for expansion and contraction of the trays and members. This lateral or sliding movement allowed by present fastening devices is sufficient to prevent the use of the trays fastened by them as reinforcing members for the vacuum distillation column shell.

To fill the long-standing recognized industry need for a new, more efficient and economic vacuum distillation column design suitable for today's distillation processes, a novel wedge-type fastening device is required which can be conveniently used to quickly install trays in columns without the need for tedious precise operations which require the use of highly skilled workers for extended time periods but yet will allow the use of such trays as reinforcing members for the column shell so that additional stiffening members are not necessary.

SUMMARY OF THE INVENTION

The vacuum distillation column of this invention comprises a support, a shell, a tray support ring affixed to the shell, a distillation tray and a wedge-type fastening device which rigidly affixes the distillation tray to the tray support ring. The tray and the support ring rigidly fastened together by the fastening device of this invention form an internal reinforcing member which stiffens the shell of the column and prevents the collapse of the shell under the force of atmospheric pressure. More particularly the tray assembly of the vacuum distillation column comprises a shell, a tray support ring affixed to the shell, a distillation tray having a narrow opening positioned substantially radially near the edge of the tray so that when the tray is placed on the support ring the opening overlaps the support ring and a wedge-type fastening device which is insertable in the narrow tray opening overlapping the support ring and, when in place, rigidly affixes the tray to the ring so that the tray and support ring reinforce the column shell and prevent collapse of the column under the force of atmospheric pressure. The wedge-type fastening device of this invention may also rigidly affix other column members together such as one tray segment to another, a tray segment to a tray support beam, and other devices to the tray or structural members of the column. A variety of wedge-type devices of this invention are disclosed which affix the members rigidly but allow the member to be easily removed for access or maintenance to fill the long-recognized industry need.

BRIEF DESCRIPTION OF DRAWINGS

FIG. 1 is a transverse, vertical, sectional view of a vacuum distillation column.

FIG. 2 is a transverse, vertical, sectional view of a tray assembly which may be used in the vacuum distillation column of FIG. 1.

FIG. 3 is a transverse, vertical, sectional view of an alternate tray assembly which may be used in the vacuum distillation column of FIG. 1.

FIG. 4 is a longitudinal, sectional view showing a fastening device in fastening position.

FIG. 5 is a perspective view of the hook element and a wedge element of one of the fastening devices.

FIG. 6 is a perspective view of a modified form of hook element.

FIG. 7 is a perspective view, similar to FIG. 6, of another form of hook element.

FIG. 8 is a longitudinal, sectional view showing another form of fastening device in fastening position.

FIG. 9 is a perspective view of a modified form of hook element useful in the form of fastening device of FIG. 8.

FIG. 10 is a perspective view of the elements of a fastening device not in fastening position.

DETAILED DESCRIPTION

In the drawings the numeral 10 designates the cylindrical wall or shell of a vacuum distillation column or vessel which may be of any of a number of different types. The column may be of any suitable or desired type, construction, diameter and height. A suitable support 11 provides a base for the column to hold it in place. A plurality of openings 12, the number and size of which may vary depending on the size and use of the column, permit various feed streams to enter the column and effluent product and waste streams to leave the column. Additional appropriately-sized openings or manways 13 permit entry into the column for maintenance, cleaning, inspection or other purposes. A plurality of trays 14 extend transversely across the interior of the column at spaced intervals substantially throughout the height thereof. The quantity and spacing of the trays are subject to variation in accordance with the size of said column and its use. A tray may be of unitary construction or made up of a plurality of tray segments rigidly fixed together. Although it is preferred in the column of this invention to use an improved fastening device 16 of this invention, shown in FIGS. 2 and 3 and hereinafter described in detail, to fix the tray segments 15 to each other as in FIG. 2 or to a transverse support member 17 as in FIG. 3, any suitable rigid fastening means such as bolting, riveting, etc., may be utilized either by itself or in combination with other types of rigid fastening means. In this description, a rigid fastening means is means which prevents substantially radial inwardly-directed motion of a member in a distillation column or a distillation column tray assembly. Each tray 14 is supported within the column by a substantially annular, flat ring, i.e., a tray support ring 18, which is secured to the internal surface of the shell 10 by welding or other suitable means, and projects radially inwardly from said shell as shown in FIGS. 2 and 3. Where a transverse support member is used as in FIG. 3 said member may be of any desired construction and may be permanently secured to the shell or the support ring or may be rigidly fixed to the support ring by a fastening device of this invention. The tray 14 is rigidly fastened to the support ring 18 by an improved fastening device of this invention 16 whereby the tray and the tray support ring form an internal reinforcing diaphragm, also referred to as a rigid diaphragm-type reinforcing member, which stiffens the shell 10 of the vacuum distillation column and prevents collapse of the shell under the force of atmospheric pressure. Thus, the improved fastening device of this invention affixes the position of the tray support ring relative to the distillation tray so that substantially radial inwardly-directed motion of the support ring is prevented. In this manner the shell to which the support ring is affixed is stiffened by the rigid diaphragm formed by the support ring and distillation tray rigidly fixed together by a wedge-type fastening device of this invention. There is, as a result, no need for additional external or internal reinforcing members to prevent collapse of the shell when the column is operated at an absolute pressure of less than 14.7 pounds per square inch. Freedom from the need for additional reinforcing members gives greater flexibility in the placement of openings and leads to more efficient column design. A further advantage of the column of this invention is that the fastening device which holds the trays rigidly in place may be readily removed even when located in areas where access is limited which allows the trays to be quickly taken out for maintenance, replacement, cleaning, inspection, etc. Under some circumstances it may be desirable also to use stiffening rings to reinforce columns of this invention as well as trays rigidly fixed to the support ring by a fastening device of this invention. Such additional rings may be particularly desirable in portions of the column where no trays are present. Additional internal support members or braces may also be utilized without departing from the scope of this invention.

A fastening device 16, as shown in FIG. 4 includes a substantially flat hook or latch element 21 and is preferably of general C-shape to provide an overhanging head or hanger portion 22 and an underlying bill portion 23 connected by an intermediate portion or shank 24. An elongate or narrow opening or slot 25 is formed substantially radially near the edge of the tray 14 positioned so that a portion of the slot 25 overlaps the support ring 18. Where the fastening device is used to fix a tray segment 15 to a support member 17 or a second tray segment, the slot 25 is formed near the edge of the tray segment substantially perpendicular to the edge of the tray segment 15 and is positioned so that a portion of the slot 25 overlaps an edge of the support member or the second tray segment. In like manner the slot is positioned in any member which is to be fixed to another member. The hook 21 is insertable in the slot 25. The overhanging head 22 and the underlying bill 23 provide a recess 26 for receiving and coacting with the tray support ring, support member, tray segment or other member overlapping a portion of slot 25. It is preferable to form the hook 21 of one piece or to employ two substantially complementary metallic sections or members 27 which are disposed in parallel relation and have their bill portions welded or otherwise secured together. The head and shank portions are spread or bent outwardly and upwardly to provide a slot or space 28 therebetween. Upstanding lugs 29 are formed on the upper end of the head portions of the members, with one of the lugs being of greater length and being bent over the other lug so as to connect the upper ends of said members and provide a top wall for the slot 28. The lower edge portion of the bill 23 is preferably curved to facilitate insertion of said bill in the slot 25 which may thereby be of limited length. It is also desirable to curve the upper edge portion of hook head 22. It is pointed out that spreading of the members 27 is sufficient to cause the shank portion 24 of the hook to snugly engage the side walls of the slot 25 when the bill 23 is inserted therethrough. It is also to be noted that it is preferred that the upper portion of the shank have a greater cross-sectional thickness than its lower portion thereof and that the hanger extends laterally from the upper end of the shank with a cross-sectional thickness comparable to, i.e., substantially the same as, the thickness of the upper portion of the shank.

The slot 28 of the hook is adapted to receive a flat, upright wedge element or locking key 30 which has its upper and lower surfaces tapered or inclined from one end to the other. It is preferred that such upper and lower surfaces have a locking taper. Suitable notches or recesses 31 may be formed in the upper and lower surfaces of the key 30 adjacent its larger end for facilitating removal thereof. In a more preferred wedge element or key the angle of taper is about 3° or less which results in a self-locking action which prevents the wedge from working loose after the fastening device is installed. For increasing the frictional engagement between the key 30 and the slot 28 of the hook the tapered edges of the key may be knurled or a suitable dimple 32 as shown in FIG. 5 may be formed in the head portion of each member 27 so as to provide an inwardly-directed projection or tit for engaging the lateral surfaces of said key. Similarly a dimple may be formed in the key to increase the frictional engagement between the key and a lateral surface of the hanger.

The latch element or hook 21 is inserted through the slot 25 of the tray or other member whereby its bill 23 engages the underside of the support ring or member overlapping a portion of slot 25 and whereby its recess 26 receives and accommodates the adjacent marginal edge portion of the support ring or other member. The hook is inserted in the slot in such manner that its head 22 is disposed overlying the edge of the portion of the slot which overlaps the edge of the support ring or other member. The key 30 is inserted in the slot 28 above and in engagement with the tray or other slotted member with its reduced end overlying that portion of the tray or other slotted member that overlaps the support ring or other member. It is desirable to drive or otherwise force the key into snug frictional engagement with the walls of its slot and with the tray or other slotted member thereby drawing the hook upwardly with its bill 23 in snug engagement with the lowermost member being fastened. At the same time the tray or other slotted member is being urged downwardly toward the bill of the hook whereby the members being fastened are frictionally fastened together.

Where the hook is made of one piece the upper portion of the head may be of greater height than shown with the lengthened portion bent to one side and downward to form an inverted U-shaped hanger element on one side of the hook suitable for engaging a suitable key similar to the key 30. In some installations, it is impossible for the key of the fastening device to extend longitudinally with its hook due to obstructions. As shown in FIGS. 6 and 7, a hook 21' is provided with an upstanding shank 24' and has an inverted U-shaped hanger element 22' welded or otherwise secured to the forward edge of the shank for receiving a suitable key (not shown) similar to the key 30. The hanger element 22' overlies the inner portion of the bill 23' of the hook 21' and may extend at a right angle to the body of said hook (FIG. 6) or any other angle relative thereto (FIG. 7).

The hook and key described above coact to prevent the members fastened together from separating from each other but these elements alone will not eliminate a lateral or sliding movement of the members relative to each other. To rigidly fix the member's positions in relation to each other within the confines of the column shell a second flat wedge element or tapered locking key 40, similar in shape to the key 30 and insertable in slot 25, is necessary. It is preferred that the tapered edges of the second flat wedge element 40 have a locking taper. The slot 25 is preferably only slightly wider than the thickness of the bill 23 and the key 40. An edge 41 of the slot distant from the edge of the tray or slotted member 14 is referred to as the edge of the opening distant from the support ring or second member or, more simply, the distant edge. A second edge 42 of the slot 25 which is opposite distant edge 41 near the edge of the tray or slotted member and which overlaps the support ring or unslotted member is referred to as the near edge overlapping the support ring or second member or, more simply, the near edge. The second key 40 is inserted in the slot 25 between the shank 24 of the hook 21 and the edge 41 of the slot 25 distant from the edge of the support ring or other member 18 which overlaps a portion of the slot 25. The large end of second key 40 is wider than the opening between the distant edge 41 and the shank 24. The small end of second key 40 is narrower than the opening between the edge 41 and the shank 24. The thickness of second key 40 is less than the narrow dimension of slot 25. The wedge 40 is driven home, i.e., firmly seated, to snugly fill the space between the distant edge 41 and the shank 24 and prevent movement of the shank 24, and in turn the support ring or other member 18 whose edge contacts said shank, toward the distant edge 41. In a more preferred wedge element or key, the angle of taper is about 3° or less which results in a self-locking action which prevents the wedge from working loose after the fastening device is installed. For increasing the frictional engagement between the key 40 and the distant edge 41 and the shank 24, either or both of the tapered edges of the key may be knurled. Where the hook 21 is made of one piece and the U-shaped channel for receivig the key 30 is formed on one side of the hook and where the hanger element 22′ is at an angle to the shank 24 as in FIGS. 6 and 7, the second key 40 may be made of a single flat piece or a number of pieces welded or suitably secured together so that the key 40 has a thickness about the same as or comparable to the thickness of bill 23 of the hook 21. Where the hook 21 receives the key 30 as shown in FIG. 4, the second key 40 may be in the shape of an inverted U as shown in FIG. 10, second key 40′, with each of the substantially parallel legs being a wedge element to snugly fill the portion of the slot 25 between the distant edge 41 and the shank 24 and prevent movement of the shank 24, and in turn the support ring or other member 18 whose edge contacts said shank, toward the distant edge 41 but still allow insertion and withdrawal of the key 30 with regard to the hanger element 22 through the open space between the substantially parallel legs of said second key. If it is not desired to use a U-shaped wedge element 40′ to hold the shank 24 in place with regard to distant edge 41, a single flat wedge which is inserted into the slot 25 on one side of key 30 or two identical wedges inserted into the slot 25 one on each side of key 30 may be used.

Another form of fastening device is shown in FIG. 8. The device includes a generally C-shaped substantially flat hook or latch element 50 to provide an overhanging head portion 51 and an underlying bill portion 52 connected by an intermediate or shank portion 53. The hook 50 is insertable in the slot 25. The overhanding head 51 and the underlying bill 52 provide a recess 54 for receiving and coacting with the tray, tray segment, tray support ring, support member, or other member 18 overlapping a portion of slot 25. The open end of recess 54 is wider than the combined cross-sectional thickness of the unfastened slotted and unslotted members to be fastened together. The closed end of recess 54 is narrower than the combined cross-sectional thickness of the slotted and unslotted members when fastened together. Preferably the recess 54 is of approximately concentric origin. It is also preferable that the slot 25 be positioned in the tray 14 or tray segment so that, when the tray 14 or tray segment is rigidly fixed in place by the form of fastening device illustrated in FIG. 8, the near edge 42 of the slot 25 is not in contact with the closed end of recess 54. It is still more preferable the slot 25 be positioned in the tray 14 or tray segment so that, when the tray 14 or tray segment is rigidly fixed in place by the form of fastening device illustrated in FIG. 8, neither the near edge 42 of the slot 25 nor the edge of the support member 18 is in contact with the closed end of recess 54.

In order to prevent the hook 50 from being inadvertently dropped through the slot 25, a slot 55 may be cut in the upper portion of the head 51 and the edges of slot 55 crimped to opposite sides as shown in FIG. 9. In addition to or instead of such a slot with crimped sides, a small rod, bar or plate may be welded or attached by other suitable means transversely to the upper portion of the head 51 to accomplish the same purpose. Also the head portion of the hook may be dimpled to form a projection of sufficient height to prevent the hook from being inadvertently dropped through the slot.

The latch element or hook 50 is inserted through the slot 25 of the tray 14 or other member whereby its bill 52 engages the underside of the support ring or member 18 overlapping a portion of slot 25 and whereby its recess 54 receives and accommodates the adjacent marginal edge portion of the support ring or other member 18. The hook is inserted in the slot in such manner that its head 51 is disposed overlying the near edge 42 of the portion of the slot which overlaps the edge of the support ring or other member 18. A flat wedge element or tapered locking key 60, similar in shape to key 30 and second key 40, is inserted in the slot 25 between the shank 53 of the hook 50 and the edge 41 of the slot 25 distant from the edge of the support ring or other member 18 which overlaps a portion of the slot 25. The large end of the key 60 is wider than the opening between the distant edge 41 and the shank 53 when the hook 50 firmly fastens the slotted member 14 to the unslotted member 18. The small end of the key 60 is narrower than the opening between the edge 41 and the shank 53 when the hook 50 is in loose contact with the slotted member 14 and unslotted member 18. It is preferred that the tapered edges of the locking key 60 have a locking taper. The thickness of the hook 50 and the key 60 is less than the narrow dimension of slot 25. In a more preferred wedge element or key, the angle of taper is about 3° or less which results in a self-locking action which prevents the wedge from working loose after the fastening device is installed. For increasing the frictional engagement between the key 60 and the distant edge 41 and the shank 53, either or both of the tapered edges of the key may be knurled. The key 60 is driven home, i.e. firmly seated, to snugly fill the space between the distant slot edge 41 and the shank 53 and urges the hook 50 forward toward the near edge 42 of the slot 25. The edges of the head 51 and the bill 52 of the hook 50 which form the recess 54 exert a clamping action on the slotted member 14 and the unslotted member 18 as the hook 50 is urged forward by the key 60. This clamping action of the edges of the head and bill prevents separation of the slotted member 14 and the unslotted member 18. The key 60 firmly seated and snugly filling the space between the distant slot edge 41 and the shank 53 prevents movement of the hook 50 and in turn the support ring or other member 18 toward the distance slot edge 41. The coaction of the hook, key and slot in the tray rigidly fix the tray to the support ring and shell of the column to form a reinforcing diaphragm or a rigid diaphragm-type reinforcing member which prevents collapse of the vacuum distillation column under the force of atmospheric pressure. Likewise, within the confines of the column whose shell necessarily limits movement of members, positioned substantially as chords of the column circumference in a plane perpendicular to the vertical axis of the column, outward from the center of the column, the fastening devices described above rigidly fasten such members together. The fastening devices are particularly useful in rigidly fixing tray segments together and to tray support members to form a rigidly fastened together tray which in turn can be rigidly fastened to the support ring which is attached to the column shell to form a reinforcing diaphragm to prevent collapse of a distillation column operating under a vacuum.

An illustrative example of the savings in weight of a column of this invention is shown in a vacuum distillation column of 35,000 pounds per square inch minimum specified yield strength steel having an outside diameter of 14 feet and an overall height from the tangent of the top head to the tangent of the bottom head of 110 feet with 52 trays at 2 feet spacing, a 4 foot bottom sump and a 4 foot top vapor disengaging space. Such a column constructed by conventional methods would require 8 external stiffening rings spaced at 12 feet on centers with a ⅝ inch steel shell. A column of this invention utilizing the tray assemblies as reinforcing diaphragms may be designed with a ⅜ inch shell and without the necessity for any external stiffening rings. The column of this invention is over 27 tons lighter than the conventional column. 47,300 pounds of the weight saving results from the lighter weight shell and 7,320 pounds results from the elimination of the need for stiffening rings. In the design of a process this weight saving is of significance not only in the cost of construction of the column itself but also in determining the type and cost of the support required to hold the column in place.

The foregoing description of the invention is explanatory thereof and various changes in the size, shape and materials, as well as in the details of the illustrated construction may be made within the scope of the appended claims, without departing from the spirit of the invention.

We claim:

1. In a vacuum distillation column, a distillation tray assembly comprising a shell (10), a tray support ring (18) affixed to the shell (10), a distillation tray (14) having a narrow opening (25) positioned substantially radially near the edge of the tray (14) which opening, when the tray (14) is placed upon the support ring (18), overlaps the support ring (18) and a type fastening device (16) which comprises a hook (21) having a shank (24) insertable in the opening (25) of the tray (14), a bill (23) projecting from one end of the shank (24) so as to be insertable through the tray opening (25) in underlying relation to the tray (14) and overlapping the support ring (18), a first wedge-shaped key (30), a hanger (22) extending from the other end of said shank (24) for receiving and holding the key (30) in functional engagement with the tray (14), the hanger (22) overlying the tray in substantially parallel spaced relation, said shank (24) being enlarged in cross-section adjacent said hanger (22) so as to engage and close a portion of the tray opening (25) adjacent the portion of the opening (25) overlapping the support ring (18) and a second wedge-shaped key (40) insertable in the portion of the tray opening (25) between the shank (24) and the edge (41) of the opening (25) distant from the support ring (18) and frictionally engageable, when firmly seated, in said portion of the opening (25) whereby the position of the support ring is fixed relative to said distant edge (41) with regard to movement by said support ring (18) toward said distance edge (41).

2. A distillation tray assembly according to claim 1 wherein the hanger (22') extends transversely to the bill (23').

3. In a vacuum distillation column, a distillation tray assembly comprising a shell (10), a tray support ring (18) affixed to the shell (10), a distillation tray (14) having a narrow opening (25) positioned substantially radially near the edge of the tray (14) which opening, when the tray (14) is placed upon the support ring (18), overlaps the support ring (18) and a wedge-type fastening device (16) which comprises a hook having a shank (24) insertable in the opening (25) of the tray (14), a bill (23) projecting from one end of the shank (24) so as to be insertable through the tray opening (25) in underlying relation to the tray (14) and overlapping the support ring (18), the upper portion of the shank (24) having a greater cross-sectional thickness than the lower portion thereof so as to engage within and close a portion of the tray opening (25) adjacent the portion of the opening overlapping the support ring (18), a hanger (22) extending laterally from the upper end of the shank and being of cross-sectional thickness comparable to the thickness of the upper portion of the shank (24), said upper portion of the shank (24) and hanger (25) being coplanar and having a coplanar slot (28) therein, a first wedge-shaped key (30) adapted to be received in said slot (28) and to urge the tray (14) toward the bill (23) of the hook (21), and a second wedge-shaped key (40) insertable in the portion of the tray opening (25) between the shank (24) and the edge (41) of the opening (25) distant from the support ring (18) and frictionally engageable, when firmly seated, in said portion of the opening (25) whereby the position of the support ring (18) is fixed relative to said distant edge (41) with regard to movement by said support ring (18) toward said distant edge (41).

4. In a vacuum distillation column, a distillation tray assembly comprising a shell (10), a tray support ring (18) affixed to the shell (10), a distillation tray (14) having a narrow opening (25) positioned substantially radially near the edge of the tray (14) which opening, when the tray (14) is placed upon the support ring (18), overlaps the support ring (18) and a wedge-type fastening device which comprises a latch element (50), having a shank (53) insertable in the opening (25) of the tray (14), a bill (52) projecting from one end of the shank (53) so as to be insertable through the tray opening (25) in underlying relation to the tray (14) and overlapping the support ring (18), and an overhanging head (51) extending from the upper end of the shank (53), said shank (53), bill (52) and head (51) being coplanar and forming a recess (54) to receive a near edge of the opening (25) of the tray (14) and the support ring (18) which recess (54) has an open end wider than the combined cross-sectional thickness of the unfastened tray (14) and support ring (18) and a closed end narrower than the combined cross-sectional thickness of the tray (14) and support ring (18) fastened together, and a wedge-shaped key (60) insertable in the portion of the tray opening (25) between the shank (53) and a distant edge (41) of the opening (25) of the tray (14) which key (60) is frictionally engageable in said portion of the opening (25) and coacts with said latch element (50) whereby the position of the support ring (18) is fixed relative to said distant edge (41) with regard to movement by said support ring (18) toward said distance edge (41).

5. In a distillation column tray assembly, a fastening device (16) in combination with a first member (15) having a narrow opening (25) therein and a second member (17) having an edge overlapping said opening (25) which fastening device (16) comprises a hook (21) having a shank (24) insertable in the opening (25) of the first member (15), a bill (23) projecting from one end of the shank (24) so as to be insertable through the opening (25) in underlying relation to the first member (15) and overlapping the edge of the second member (17), a first wedge-shaped key (30), a hanger (22) extending from the other end of said shank (24) for receiving and holding the key (30) in frictional engagement with the first member (15), the hanger (22) overlying the first member (15) in substantially parallel spaced relation, said shank (24) being enlarged in cross-section adjacent said hanger (22) so as to engage and close a portion of the opening (25) adjacent the portion of the opening (25) overlapping the edge of the second member (17) and a second wedge-shaped key (40) insertable in the portion of the opening (25) between the shank (24) and the edge (41) of the opening (25) distant from the edge of the second member (17) and frictionally engageable, when firmly seated, in said portion of the opening (25) whereby the position of the edge of the second member (17) is fixed relative to said distant edge (41) of the opening (25) with regard to movement by said second member (17) toward said distant edge (41) of the opening (25).

6. A fastening device according to claim 5 wherein the hanger (22') extends transversely to the bill (23').

7. In a distillation column tray assembly, a fastening device (16) in combination with a first member (15) having a narrow opening (25) therein and a second member (15) having one edge overlapping said opening (25)

which fastening device (16) comprises a hook (21) having a shank (24) insertable in the opening (25) of the first member (15), a bill (23) projecting from one end of the shank (24) so as to be insertable through the opening in underlying relation to the first member (15) and overlapping the edge of the second member (15), the upper portion of the shank (24) having a greater cross-sectional thickness than the lower portion thereof so as to engage within and close a portion of the opening adjacent the portion of the opening (25) overlapping the edge of the second member (15), a hanger (22) extending from the upper end of the shank (24) and being of cross-sectional thickness comparable to the thickness of the upper portion of the shank (24), said upper portion of the shank (24) and hanger (22) being coplanar and having a coplanar slot (28) therein, a first wedge-shaped key (30) adapted to be received in said slot (28) and to urge the first member (15) toward the bill (23) of the hook (21), and a second wedge-shaped key (40) insertable in the portion of the opening (25) between the shank (24) and the edge (41) of the opening (25) distant from the edge of the second member (15) and frictionally engageable, when firmly seated, in said portion of the opening (25) whereby the position of the edge of the second member (15) is fixed relative to said distant edge (41) of the opening (25) with regard to movement by said second member (15) toward said distant edge (41) of the opening (25).

8. In a distillation column tray assembly, a fastening device (16) in combination with a first member (15) having a narrow opening (25) therein and a second member (15) having one edge overlapping said opening (25) which fastening device (16) comprises a latch element (50), having a shank (53) insertable in the opening (25) of the first member (15), a bill (52) projecting from one end of the shank (53) so as to be insertable through the opening (25) in underlying relation to the first member (15) and overlapping the edge of the second member (15), and an overhanging head (51) extending from the upper end of the shank (53), said shank (53), bill (52) and head (51) being coplanar and forming a recess to receive a near edge of the opening (25) of the first member (15) and the edge of the second member (15) which recess has an open end wider than the combined cross-sectional thickness of the unfastened first and second members (15) and a closed end narrower than the combined cross-sectional thickness of the first and second members (15) fastened together, and a wedge-shaped key (60) insertable in the portion of the opening (25) in the first member (15) between the shank (53) and a distant edge (41) of the opening (25) of the first member (15) which key is frictionally engageable in said portion of the opening (25) and coacts with said latch element (50) whereby the position of the second member (15) is fixed relative to said distant edge (41) of the opening (25) in said first member (15) with regard to movement by said second member (15) toward said distant edge (41) of the opening (25) in said first member (15).

9. A distillation tray assembly according to claim 3 wherein the second wedge-shaped key (40') is in the shape of an inverted U with each of the substantially parallel legs being a wedge element to snugly fill the portion of the slot (25) between the distant edge (41) and the shank (24) but still allow insertion and withdrawal of the key (30) with regard to the hanger element (22) through the open space between the substantially parallel legs of said second key.

10. A fastening device according to claim 7 wherein the second wedge-shaped key (40') is in the shape of an inverted U with each of the substantially parallel legs being a wedge element to snugly fill the portion of the slot (25) between the distant edge (41) and the shank (24) but still allow insertion and withdrawal of the key (30) with regard to the hanger element (22) through the open space between the substantially parallel legs of said second key.

References Cited

UNITED STATES PATENTS

| | | | |
|---|---|---|---|
| 2,710,678 | 6/1955 | Rapisarda | 261—114 X |
| 2,320,073 | 5/1943 | Gibb | 261—114 |
| 2,341,091 | 2/1944 | Glitsch | 261—113 |
| 2,582,826 | 1/1952 | Glitsch | 202—158 |
| 2,666,737 | 1/1954 | Hurd | 202—153 X |
| 2,916,272 | 12/1959 | Ragatz | 261—114 |
| 2,917,293 | 12/1959 | Mendelsohn et al. | 202—158 X |
| 2,967,699 | 1/1961 | Brown | 261—114 |
| 2,375,409 | 5/1945 | Glitsch | 261—114 |
| 2,540,781 | 2/1951 | Glitsch | 261—114 |
| 2,611,457 | 9/1952 | Glitsch | 52—584 |

WILBUR L. BASCOMB, JR., Primary Examiner

U.S. Cl. X.R.

52—489, 584; 202—205; 261—114; 292—256